Figure 1:
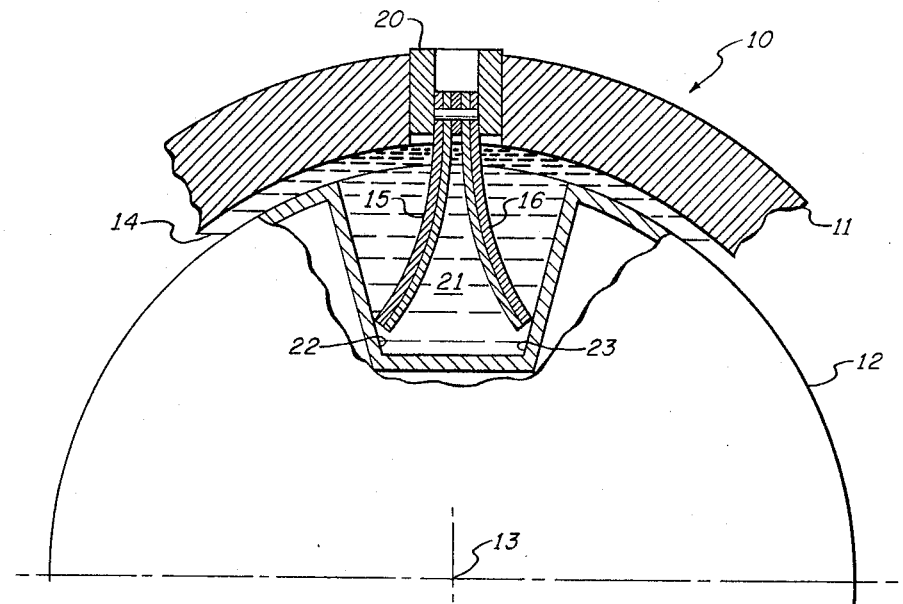

3,283,592
GYROSCOPIC CAGING APPARATUS
Sherman Adler, Jamaica, and Saul Fenster, Great Neck, N.Y., assignors to Sperry Rand Corporation, Great Neck, N.Y., a corporation of Delaware
Filed Aug. 4, 1961, Ser. No. 129,341
4 Claims. (Cl. 74—5.1)

The present invention relates to apparatus for caging a gyroscopic instrument and particularly to a device which automatically limits the motion of a sensitive element of a gyroscopic instrument at temperatures below that of the operating temperature while permitting the sensitive element to have the necessary freedom at operating temperatures.

One of the problems associated with modern gyroscopic instruments particularly those containing internally floated members is that they normally require a relatively long period of time to reach their operating temperature and viscosity when initially energized. This is particularly true of gyroscopic instruments having floated sensitive elements since at low temperatures the flotation fluid may be in a solid form. Normally, it is desirable to have the gyroscopic instrument initially provided with a zero output signal in order to avoid disturbances throughout its associated control system. For the gyroscopic instrument to have a zero output signal, the sensitive element thereof must be in a predetermined centralized or null position. A substantial amount of time is required to return the sensitive element to its null position when the gyroscopic instrument is initially energized particularly when the ambient temperature is relatively low and the sensitive element is floated because of the relatively high viscosity of the cold flotation fluid and the limited torque provided by the gyroscopic torquing device.

Further, in certain types of extremely sensitive gyroscopic instruments having floated sensitive elements, the electrical leads connected between the gyroscopic housing and the sensitive element which in turn houses the gyroscope rotor are extremely fine to prevent applying coercive torques on the sensitive element during normal operation. Rotating the sensitive element through the high viscosity flotation fluid during the warm up period tends to cause distortion and sometimes breakage of the delicate electrical leads.

It is a primary object of the present invention to provide a device which automatically cages the sensitive element of a gyroscopic instrument below its operating temperature while permitting movement of the sensitive element at its operating temperature.

It is an additional object of the present invention to provide a simple and inexpensive device for automatically maintaining a sensitive element of a gyroscopic instrument in a predetermined position below operating temperatures to eliminate the necessity of moving the sensitive element below its normal operating temperature.

The above objects are achieved by a pair of adjacent bimetallic strips which have one end secured to a gyroscope housing and the other end cooperative with an opening in a sensitive element that is positionably disposed within the housing. The bimetallic strips extend outwardly with respect to each other to abut against the sides of the opening in the sensitive element below operating temperatures thereby maintaining the sensitive element in a predetermined null position. At operating temperatures, the bimetallic strips become substantially parallel with respect to each other to permit relative movement between the sensitive element and the gyroscope housing.

Figure 2:
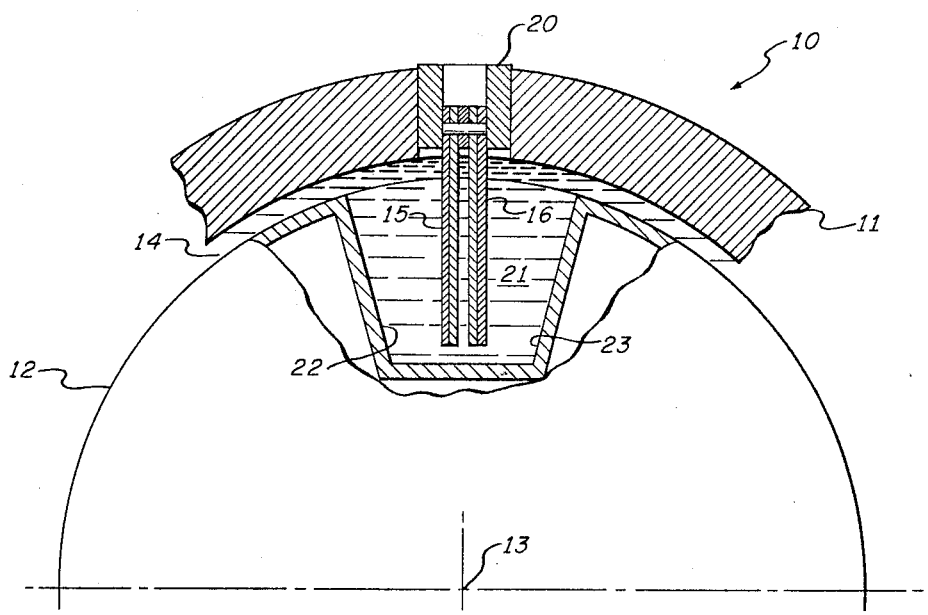

Referring now to the drawings,

FIG. 1 is a vertical section on an enlarged scale of a gyroscope having a floated sensitive element showing the device of the present invention caging the sensitive element; and FIG. 2 is a view similar to FIG. 1 showing the device of the present invention at the normal operating temperature of the gyroscope thereby permitting relative movement between the sensitive element and the gyroscope housing.

For purposes of example, the present invention will be applied to an inertial integrating gyroscope having a floated sensitive element although it will be appreciated that the invention is equally applicable to other types of gyroscopic instruments.

Referring to FIG. 1, a single degree of freedom integrating gyroscope 10 includes a hollow cylindrical gyroscope housing 11 within which a cylindrical sensitive element or float 12 is disposed. The sensitive element 12 is mounted for rotation about its output axis 13 which is perpendicular to the plane of the paper by means of bearings, not shown, spaced along the output axis 13. A gyro rotor, not shown, spins within the sensitive element 12 about a horizontal axis that is perpendicular to the output axis 13.

The space within the housing 11 between the outer surface of the sensitive element 12 and the inner surface of the housing 11 is filled with a flotation fluid 14 which surrounds and supports the sensitive element 12. The outer diameter of the sensitive element 12 is slightly less than the inner diameter of the housing 11 in order that the thin film of the flotation fluid 14 therebetween provides the integrating function due to the viscous shear effects of the fluid 14. The gyroscope 10 may be of the type shown in U.S. application Serial No. 32,780 entitled "Electromagnetic Transducer Device" of R. H. Bolton filed May 31, 1960.

The purpose of the gyroscope 10 is to measure rotation about its input axis and to provide an electrical output signal in response thereto having an amplitude and phase representative of the amount and direction respectively of the rotation. The gyroscope 10 is provided with a pickoff, not shown, in order to provide an electrical output signal representative of the movement of the sensitive element 12 relative to the housing 11 around the axis 13. The gyroscope 10 is further provided with a torquing device, not shown, for applying a torque to the sensitive element 12 around the axis 13 for driving the sensitive element 12 relative to the housing 11. The torquing device provides a relatively weak torque around the axis 13 and at low temperatures the combination of the relatively weak torque and the relatively high viscosity of the flotation fluid 14 necessitates a substantially long time interval for the sensitive element 12 to be rotated to its null position in the absence of the present invention. Further, rotating the sensitive element 12 at low temperatures tends to distort and fracture the delicate electrical leads which bring power from he housing 11 to the motor which drives the gyro that is located within the sensitive element 12.

When the output signal from the gyroscope 10 is initially connected to its associated control system, it is necessary that the output signal be zero with the gyroscope 10 in a null condition, i.e., with the sensitive element 12 in a predetermined null position with respect to the housing 11.

In accordance with the present invention the sensitive element 12 is caged and maintained in a predetermined null position at low temperatures by means of a pair of adjacent, deformable, temperature responsive, bimetallic strips 15 and 16. The bimetallic strips 15 and 16 have one portion or end secured by a force fit or other manner to the housing 11 by means of a metallic base 20 while its other portion extends inwardly to an opening 21, that is preferably arcuate, in the periphery of the sensitive element 12. The bimetallic strips 15 and 16 are precurved outwardly as viewed in FIG. 1 with respect to each other in order that their lower extremities abut against the oppositely extending sides 22 and 23 respectively of the opening 21 at a predetermined low temperature. Under these conditions, the bimetallic strips 15 and 16 maintain the sensitive element 12 in its null position in order that there is a zero output signal from the gyroscope 10. With the extremities of the bimetallic strips 15 and 16 abutting the sides 22 and 23 respectively of the opening 21, the sensitive element 12 is prevented from moving relative to the housing 11 and is thus caged for all temperatures below a predetermined value.

When the gyroscope 10 is energized and it is being brought up to its normal operating temperature by conventional heating means, not shown, the bimetallic strips 15 and 16 continue to cage the sensitive element 12 until the flotation fluid 14 reaches a predetermined temperature. Each of the bimetallic strips 15 and 16 is composed of a metal having a high coefficient of expansion on its outside and a metal having a low coefficient of expansion on its inside as viewed in FIG. 1. As the temperature of the fluid 14 increases, the more rapid expansion of the metal on the outside of the bimetallic strips 15 and 16 tends to cause them to move towards each other until a predetermined temperature is reached at which time the extremities of the strips 15 and 16 no longer abut the sides 22 and 23 respectively of the opening 21 thereby permitting relative rotation between the sensitive element 12 and the housing 11.

At the normal operating temperature of the gyroscope 10, as shown in FIG. 2, the bimetallic strips 15 and 16 are substantially parallel to each other thereby permitting relative rotation between the sensitive element 12 and the housing 11 to the extent necessary for normal operation of the gyroscope 10.

For example, in an inertial type integrating gyroscope 10 using a conventional fluorocarbon type of flotation fluid, the bimetallic strips 15 and 16 may consist of bimetallic strip #6650 of the W. M. Chace Company. The Chace #6650 bimetallic strip consists of an alloy having a high coefficient of expansion comprising 72% manganese, 18% copper and 16% nickel on the outside as viewed in FIG. 1 and Invar having a low coefficient of expansion which consists of 36% nickel and 64% iron on the inside. The free length of each of the bimetallic strips 15 and 16 is .625 inch while the arcuate opening is 28°. The normal operating temperature of the gyroscope 10 may be 165° F. while the low or storage temperature may be approximately 0° F. or less.

It will be appreciated that many combinations of metals may be suitable for bimetallic strip operation. It will be noted, however, that conventional gyroscope flotation fluids are highly corrosive and the bimetallic strips 15 and 16 must be selected to be corrosion resistant or may be plastic coated or gold plated to provide the proper deformation while being resistant to corrosion.

Although the bimetallic strips 15 and 16 have been shown secured to the housing 11 and extending into the sensitive element 12, it will be understood that the bimetallic strips 15 and 16 may in lieu thereof be secured to the sensitive element 12 and extend into an opening in the housing 11. It will also be appreciated that the caging apparatus of the present invention permits a smaller torquing device that would otherwise be required if the sensitive element 12 had to be initially torqued through the viscous flotation fluid 14 at low temperatures. In the event, the strips 15 and 16 substantially maintain the sensitive element 12 in its null position at low temperatures but a very small output signal remains, the small output signal will be quickly reduced to zero at normal operating temperatures by the normal operation of the torquing apparatus.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. Apparatus for caging a gyroscopic instrument comprising a hollow gyroscope housing, a sensitive element positionably disposed within said housing and operative within a predetermined temperature range, an opening in said sensitive element, and deformable temperature responsive means having one portion attached to said housing and another portion exposed to the operating temperature of said instrument and cooperative with said opening, said deformable means and said opening being so constructed and arranged that within said predetermined temperature range relative movement between said sensitive element and said housing is permitted and below said predetermined temperature range relative movement therebetween is prevented.

2. Apparatus for caging a gyroscopic instrument comprising a hollow gyroscope housing, a sensitive element positionably disposed within said housing during normal operation thereof, an opening in the periphery of the sensitive element, and a pair of adjacent bimetallic members each having one portion secured to said housing and another portion subject to the operating temperature of said instrument extending inwardly and cooperative with said opening, said pair of bimetallic members and said opening being so constructed and arranged that within the normal operating temperatures of said gyroscopic instrument said bimetallic members are substantially parallel to permit relative movement between said sensitive element and said housing and at other than said normal operating temperatures said members are deformed outwardly with respect to each other and contact said opening thereby preventing relative movement between said sensitive element and said housing.

3. Apparatus for caging a gyroscopic instrument comprising a hollow gyroscope housing, a sensitive element disposed within said housing for rotation during normal operation of said instrument, said sensitive element having an opening in the periphery thereof, and a pair of adjacent deformable temperature responsive bimetallic strips having one portion secured to said housing and another portion extending inwardly and cooperative with said opening, each of said strips being precurved to extend away from each other for abutting against opposing sides of said opening at a first predetermined temperature, said pair of bimetallic strips and said opening being so constructed and arranged that at a second predetermined temperature associated with the normal operating temperature of said instrument said bimetallic strips are substantially parallel to permit relative rotation between said sensitive element and said housing and at said first predetermined temperature said strips are deformed outwardly thereby caging said sensitive element in a predetermined position with respect to said housing.

4. Apparatus for caging a gyroscopic instrument comprising a hollow cylindrical gyroscope housing, a cylindrical sensitive element mounted within said housing for rotation during normal operation, an arcuate opening having oppositely extending sides in the periphery of said sensitive element, and a pair of adjacent deformable temperature responsive bimetallic strips having one end secured to said housing and another end extending inwardly and cooperative with said opening, said bimetallic strips being precurved outwardly with respect to each other for abutting against said oppositely extending sides of said opening below the operating temperature thereby caging said sensitive element in a predetermined position with respect to said housing, said pair of bimetallic strips and said opening being so constructed and arranged that at the normal operating temperature of said gyroscopic instrument said bimetallic strips are substantially parallel to each other thereby permitting limited relative rotation between said sensitive element and said housing.

References Cited by the Examiner

UNITED STATES PATENTS

| | | | |
|---|---|---|---|
| 2,523,270 | 9/1950 | Barkalow et al. | 74—5.1 |
| 2,524,553 | 10/1950 | Wendt | 74—5.1 |
| 2,654,254 | 10/1953 | Wendt | 74—5.1 |

FRED C. MATTERN, JR., *Primary Examiner.*

BROUGHTON G. DURHAM, *Examiner.*

T. W. SHEAR, J. D. PUFFER, *Assistant Examiners.*